US006212394B1

United States Patent
Isumi

(10) Patent No.: US 6,212,394 B1
(45) Date of Patent: Apr. 3, 2001

(54) RADIO COMMUNICATION SYSTEM

(75) Inventor: Shinya Isumi, Kasuga (JP)

(73) Assignee: Matsushita Electric Industrial Co., LTD, Osaka (JP)

( * ) Notice: Subject to any disclaimer, the term of this patent is extended or adjusted under 35 U.S.C. 154(b) by 0 days.

(21) Appl. No.: 09/188,231

(22) Filed: Nov. 9, 1998

(30) Foreign Application Priority Data

Jan. 14, 1998 (JP) .................................................. 10-005658

(51) Int. Cl.[7] .............................. H04Q 7/20; H04Q 7/00
(52) U.S. Cl. ......................... 455/462; 455/464; 370/330
(58) Field of Search .................................. 455/463, 464, 455/462, 465, 434, 515, 517, 422, 426, 403, 507, 509, 555, 554, 450, 451, 452; 370/330, 339, 436, 478

(56) References Cited

U.S. PATENT DOCUMENTS

| 5,375,163 | * | 12/1994 | Kamimoto et al. | ................. 455/462 |
| 5,995,844 | * | 11/1999 | Fukuda | ................................ 455/462 |
| 6,023,460 | * | 2/2000 | Jackson et al. | ...................... 370/330 |
| 6,023,621 | * | 2/2000 | Jackson et al. | ................. 370/330 X |

FOREIGN PATENT DOCUMENTS

0629094A2 12/1994 (EP) .
9247083 9/1997 (JP) .

OTHER PUBLICATIONS

Search and Examination Report dated Feb. 29, 2000.
JP 9191488 A (SONY) Jul. 22, 1997 (abstract). In: Patent Abstracts of Japan [CD–ROM].
JP 9307939 A (Mitsubishi) Nov. 28, 1997 (abstract). In: Patent Abstracts of Japan [CD–ROM].

* cited by examiner

Primary Examiner—Tracy Legree
(74) Attorney, Agent, or Firm—Stevens, Davis, Miller & Mosher, LLP

(57) ABSTRACT

In a radio communication system (local radio system) having a plurality of radio cell stations (CS) and a plurality of radio personal stations (PS), when a certain radio personal station (PS) proceeds from a monitoring state to a call state, even during the call, the radio cell station (CS) of interest sends successively the information (slot and frequency information) which is required for the certain radio personal station (PS) to be returned back to the monitoring state to the certain radio personal station (PS) to be stored in the certain radio personal station (PS). By adopting such a procedure, when the call state has been quitted, even if the certain radio personal station proceeds once to a control channel, there is no need of obtaining the information required for the certain radio personal station to be returned back to the monitoring state. Since a time period for obtaining the information is not required, the transition from the call state to the monitoring state is immediately made.

8 Claims, 3 Drawing Sheets

RADIO COMMUNICATION SYSTEM

BACKGROUND OF THE INVENTION

The present invention relates to a radio communication system in which a voice call is capable of being made among a plurality of radio personal stations (portable terminals) and in which a plurality of radio personal stations (portable terminals) are capable of being informed of information such as a voice and various data from a central server.

In recent years, radio communication systems have developed remarkably. A conventional radio communication system will be described below.

For example, there is conceivable a local voice communication system in which in a large scale shopping center, store clerks in the store have radio personal stations, respectively, and the in-store business is carried out while the store clerks communicate with one another through voice calls or a supervisor who should direct and supervise all of the store clerks communicates with the store clerks. In this connection, a plurality of radio cell stations (base stations) are installed in a plurality of locations in the shopping center and are connected through wires to main equipment which has an exchange function and a control function.

The radio cell stations installed in the plurality of locations in the shopping center transfer the information such as voice and data to the radio personal stations by utilizing the TDMA (Time Division Multiple Access) method. Both of a slot and a carrier frequency which are to be used are managed by a radio channel managing unit provided in the radio cell station. In addition, the main equipment is connected to a multi-media server from which the voice and the data are sent onto a radio line through the main equipment and the radio cell station.

Now, a description will be given with respect to an information monitoring state in which the information such as voice and data sent from the multi-media server is monitored at all times by the radio personal stations. In accordance with the instruction issued from the main equipment, the radio cell stations simultaneously inform onto the radio lines the voice and the data which are presented by the multi-media server. In this connection, both of the carrier frequency and the slot which are used in the simultaneous information are stored in the radio channel managing unit provided in each of the radio cell stations.

In order to carry out the simultaneous information, each of the radio cell stations determines the usable carrier frequency and slot in accordance with the electric wave situation thereof. Then, each of the radio cell stations transmits the information by radio in such a way that the determined carrier frequency and the determined slot do not overlap with those which other radio cell stations use. The information exhibiting the carrier frequency and the slot which are determined and are used at this time is stored in the radio channel managing unit of each of the radio cell stations. At the time when starting the simultaneous information, each of the radio cell stations transmits the information of the carrier frequency and the slot, both of which are managed in the radio channel managing unit, to the radio personal stations through the control channel (CCH).

Each of the radio personal stations receives the control channel (CCH) transmitted by the radio cell station in the system thereof, and receives the channel information (the slot and frequency information) of the simultaneous information contained on the control channel (CCH). When the channel information of the simultaneous information can be received, the reception operation is started with the slot and the carrier frequency, so that the radio personal station proceeds to the monitoring state of the simultaneously informed information.

When the radio personal station is in the monitoring state and a user of the radio personal station carries out the manipulation for a call, the radio personal station carries out the line connection procedure by transmitting through the control channel (CCH) the assignment request which gets the associated radio cell station to assign thereto a traffic channel (TCH). On the other hand, in the associated radio cell station as well, the line connection procedure is carried out to set the channel between the radio personal station of interest and the associated radio cell station. As a result, the radio personal station of interest proceeds to the one-to-one correspondence call state.

Thereafter, when the user carries out the manipulation for quitting the call, the disconnection restoration sequence is executed, so that the radio personal station of interest makes the transition to the information monitoring state again. At this time, the radio personal station of interest receives the channel information (the slot and frequency information) for the simultaneous information contained on the control channel (CCH) of interest by searching the control channel (CCH) which is intermittently transmitted by the radio cell station of the system thereof at all times.

After having received the channel information of the simultaneous information, the radio personal station of interest starts only the reception operation with the slot and the carrier frequency to proceed to the information monitoring state (the state in which the simultaneous broadcasting, the local broadcasting and the like can be received) again.

In the above-mentioned conventional radio communication system, however, in the case where the call request and the like occur after starting the information monitoring, in order that the radio personal station of interest may proceed to the monitoring state again, the radio personal station of interest needs to start with the open search of the control channel to obtain the channel information (the slot and carrier frequency information) with which the simultaneous information is carried out. Hence, a time period of several seconds may be demanded in some cases. As a result, in such cases, the radio personal station of interest can not be immediately switched over to the monitoring state. This is a problem.

Now, it is conceivable that the radio communication system is designed in such a way that even when the transition is made from the information monitoring state to the call state, the simultaneously informed information is transmitted through the line which is being used in the call. In this case, even when the user is in call, he/she can grasp the contents of the simultaneously informed information. This is a right matter. On the other hand, in such a configuration, if it takes a time period of several seconds to obtain the channel information when the radio personal station of interest proceeds to the monitoring state again, then the simultaneously informed information will be necessarily interrupted for this time period of several seconds. As a result, there arises a problem that the user misses listening to the contents of the simultaneously informed information during that time period.

SUMMARY OF THE INVENTION

An object of the present invention is to provide a radio communication system by which in the case where a radio personal station of interest proceeds to a call state after starting an information monitoring and then is returned back to the monitoring state again, the simultaneously informed information to be transmitted can be thoroughly received.

In order to solve the above-mentioned problems, a radio communication system according to the present invention comprises: a radio cell station that includes a radio channel managing unit for managing information of a frequency and a slot which are to be used, a radio cell station line connection controlling unit for managing the line connection between a radio personal station and the radio cell station, and an information channel controlling unit for storing channel information which is used to inform simultaneously information; and a radio personal station that includes a radio personal station line connection controlling unit for managing the control of the line connection between the radio cell station and the radio personal station, and an information channel storage unit for storing channel information which is received from the radio cell station and which is used in the simultaneous information, wherein when the radio personal station proceeds to a call state, the radio cell station line connection controlling unit retrieves the channel information, which is stored in the information channel controlling unit, to transmit the retrieved channel information to the radio personal station, and the radio personal station line connection controlling unit sets, at the time when the call state has been quitted, the slot and the frequency on the basis of the channel information, which is stored in the information channel storage unit, to restart the monitoring and reception. As a result, the monitoring and reception can be immediately restarted by referring to the channel information in the information channel storage unit when a call has been quitted. Thereby, there can be obtained the advantageous effect that when the radio personal station proceeds from the information monitoring state to the call state and then the radio personal station is returned back to the monitoring state again, the simultaneously informed information to be transmitted can be thoroughly received.

In addition, there can be obtained the advantageous effect that when intending to transmit the slot and frequency information as the channel information of the simultaneous information, the line connection controlling unit on the radio cell station side converts that information into the relative slot information from the slot through which the radio personal station makes the call to transmit the resultant information, whereby the processing in the radio personal station can be simplified, and in addition thereto, a time period required for the radio personal station to restart the monitoring and reception can be shortened.

Also, there can be obtained the advantageous effect that the line connection controlling unit on the radio cell station side transmits, only when the radio personal station proceeds to the monitoring and reception state after quitting a call, the channel information of the simultaneous information at that time, whereby it is possible to prevent the unnecessary message from being transmitted to any normal radio personal stations which do not carry out the monitoring and reception.

Further, there can be obtained the advantageous effect that in the case where the slot and the frequency of the simultaneous information are changed after having once transmitted the channel information of the simultaneous information, the line connection controlling unit on the radio cell station side transmits that information to the radio personal station again, whereby even when the monitoring channel of the simultaneous information is changed due to the electric wave situation, the radio personal station can make accurately the transition to the information monitoring state.

Further, there can be obtained the advantageous effect that after having proceeded to the call state, the line connection controlling unit on the radio personal station personally inquires of the radio cell station the channel information of the simultaneous information at that time, whereby the line connection controlling unit can cope therewith in the form of the independent control unit without influencing upon the existing line connection control.

Furthermore, there can be obtained the advantageous effect that the correction of the relative position of the monitoring slot and the correction of the frequency which corrections are generated due to the channel switching and the like of the radio personal station are carried out in the radio personal station, whereby the influence due to the channel switching and the like can be prevented within the radio personal station to minimize the influence upon other control.

In addition, there can be obtained the advantageous effect that when having failed to obtain the channel information for the simultaneous information on the traffic channel, the line connection controlling unit on the radio personal station side collects the data of the control channel, obtains the channel information for the simultaneous information which has been sent through the control channel and restarts the monitoring and reception in accordance with the slot and frequency information contained in the channel information, whereby the normal operation can be carried out and hence the failsafe can be realized.

BRIEF DESCRIPTION OF THE DRAWINGS

The above and other objects as well as advantages of the present invention will become clear by the following description of the preferred embodiments of the present invention with reference to the accompanying drawings, wherein.

DETAILED DESCRIPTION OF THE PREFERRED EMBODIMENTS

Figure 1:
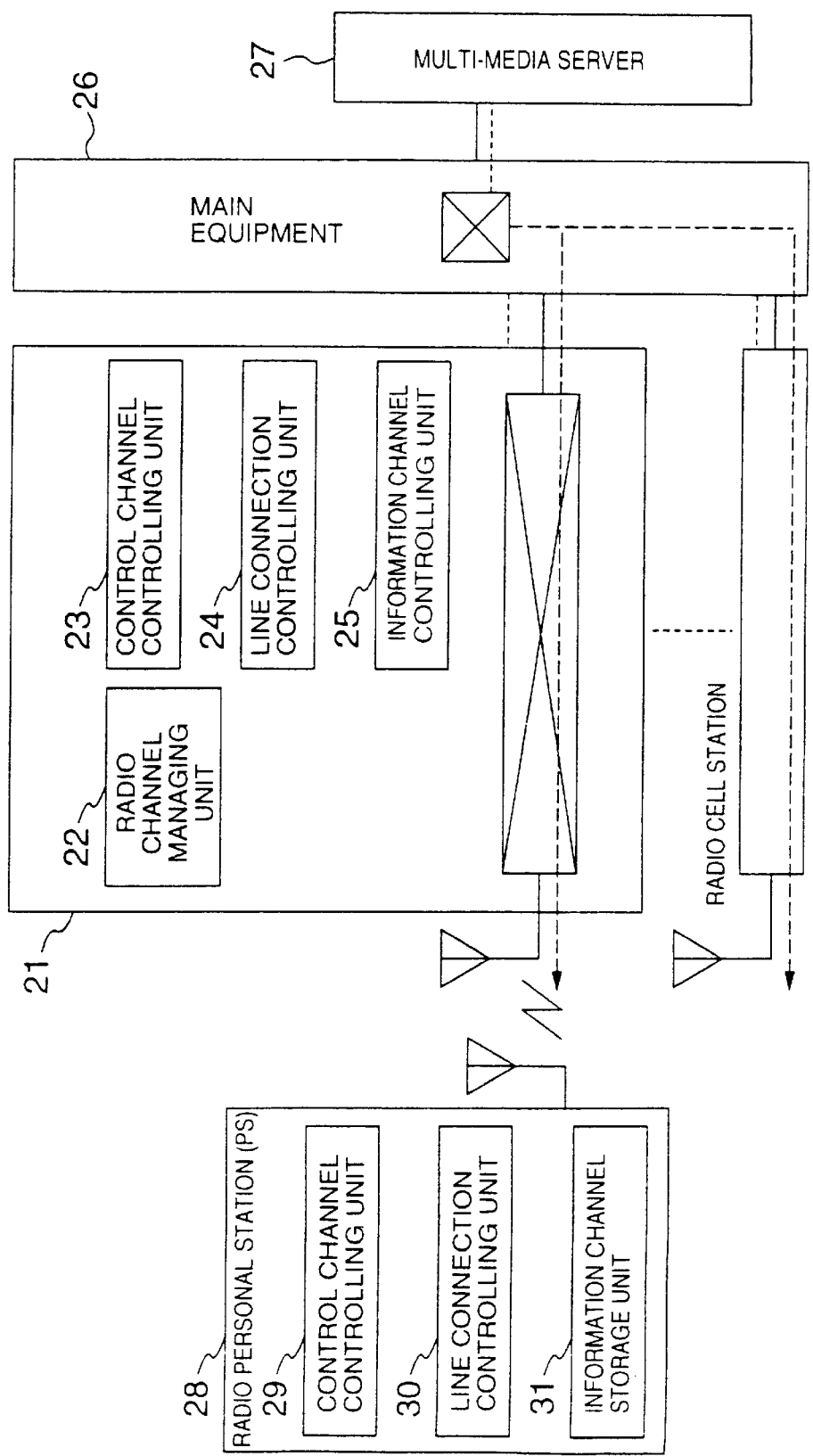
FIG. 1 is a block diagram showing a configuration of a radio communication system according to an embodiment of the present invention.

An embodiment of the present invention will be described in detail with reference to the accompanying drawings. FIG. 1 is a block diagram showing a configuration of a radio communication system according to the embodiment of the present invention. The radio communication system includes a plurality of radio personal stations, a plurality of radio cell stations, and main equipment having an exchange function and the like.

In FIG. 1, reference numeral 21 designates a radio cell station. The radio cell station 21 serves to transmit information such as a voice and control data in the form of a radio signal to the radio personal stations, and receives radio signals from the radio personal stations to convert the received radio signals into electrical signals. In the radio cell station 21, reference numeral 22 designates a radio channel managing unit for managing a carrier frequency and a slot which are to be used, and 23 designates a control channel controlling unit for carrying out the logical assembling for data transmission on a control channel (CCH). Reference numeral 24 designates a line connection controlling unit (radio cell station line connection controlling unit) for managing the control of the line connection between a radio personal station 28, which will be described later, and the radio cell station 21. Reference numeral 25 designates an information channel controlling unit for managing the slot and the carrier frequency with which the information is simultaneously informed and for managing successively the simultaneous-information-channel information (the slot and frequency information) using the function of the radio channel managing unit 22 to present the line connection controlling unit 24 with the information.

Reference numeral 26 designates the main equipment having an exchange function and the like. The main equipment 26 can accommodate the radio cell stations 21.

Reference numeral 27 designates a multi-media server having a voice or data that are to be informed onto the radio line through the radio cell station 21.

Reference numeral 28 designates the radio personal station. In the radio personal station 28, reference numeral 29 designates a control channel controlling unit for receiving data transmitted from the radio cell station 21 on the control channel (CCH), and for analyzing the received data. The control channel controlling unit 29 also transmits data onto the control channel (CCH). Reference numeral 30 designates a line connection controlling unit (radio personal station line connection controlling unit) for managing the control of the line connection between the radio cell station 21 and the radio personal station 28. Reference numeral 31 designates an information channel storage unit for storing the simultaneous-information-channel information (the slot and frequency information) received from the radio cell station 21.

In this connection, the radio cell station 21 shown in FIG. 1 includes the line connection controlling unit 24 and the information channel managing unit 25 both of which are incorporated therein. However, the main equipment 26 may include all of or a part of the functions of the line connection controlling unit 24 and information channel managing unit 25.

Figure 2:
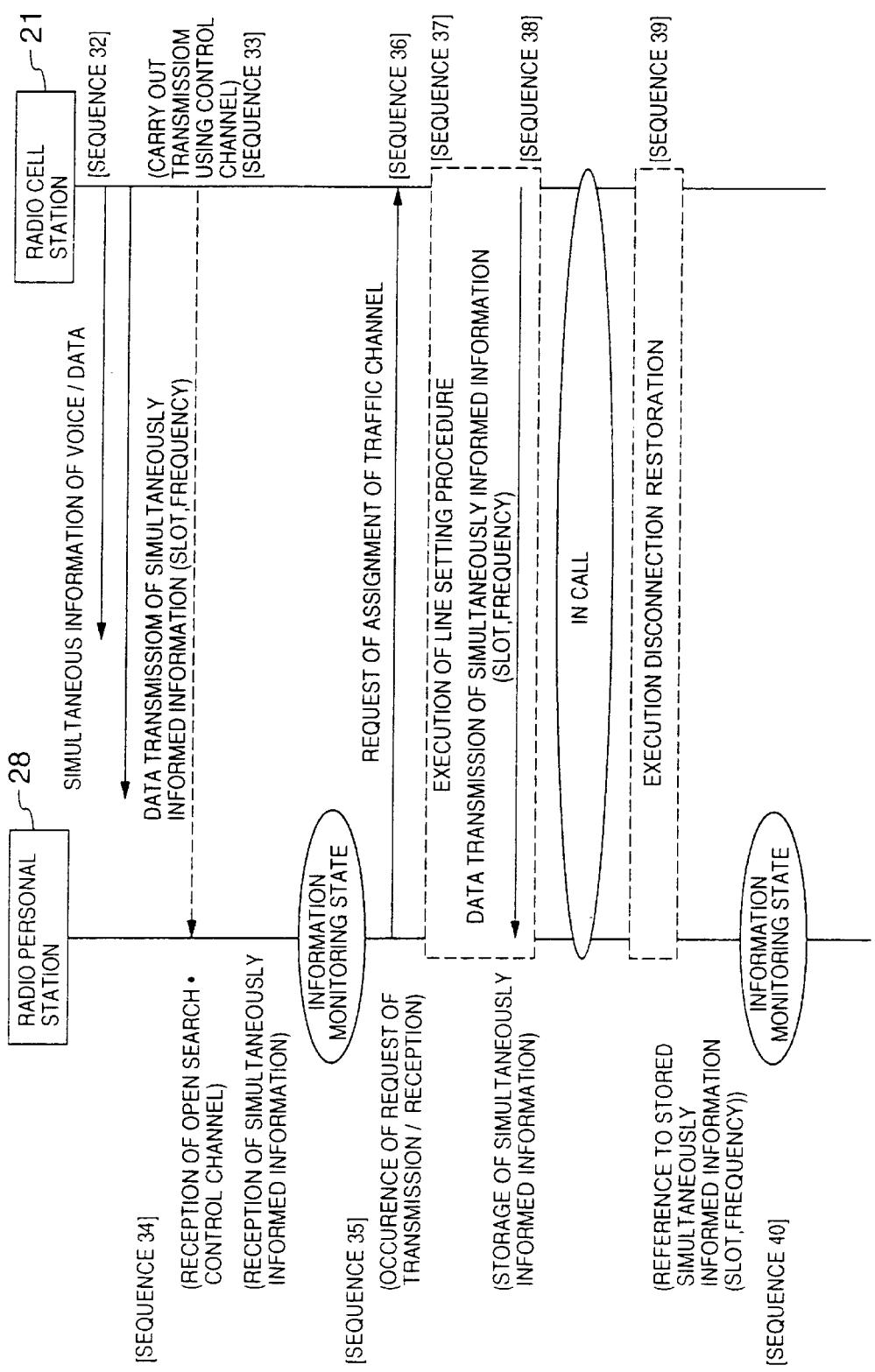
FIG. 2 is a sequence chart useful in explaining the operation when simultaneously informed information which has been transmitted through main equipment is monitored in a radio personal station.
Figure 3:
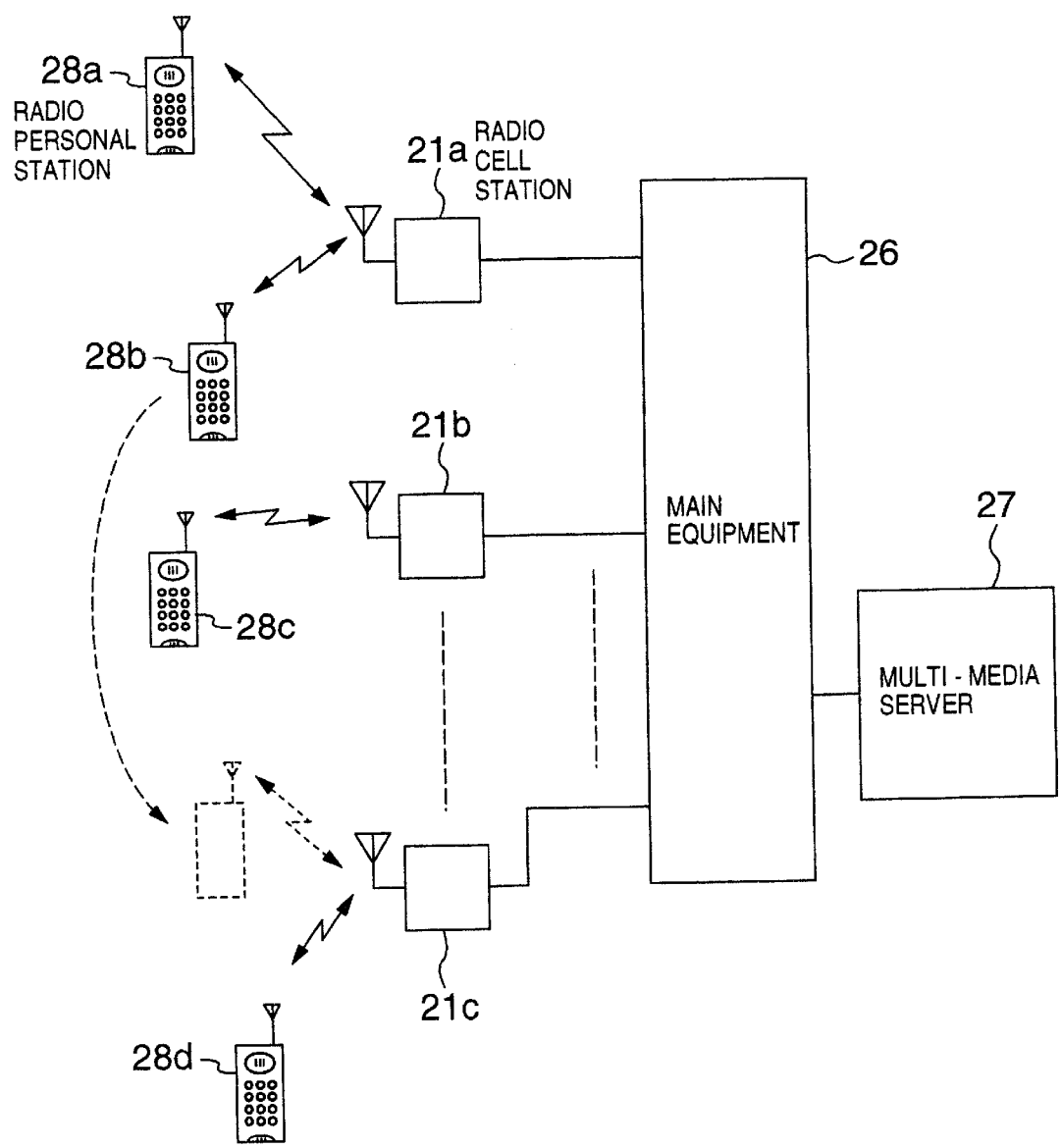
FIG. 3 is a schematic view showing construction of a connection example when the radio communication system of the embodiment of the present invention is implemented in the form of a local voice communication system.

Next, the description will be given with respect to the operation of the radio communication system according to the present embodiment as configured above with reference to FIG. 2. FIG. 2 is a sequence chart useful in explaining the operation when the simultaneously informed information which is transmitted through the main equipment is monitored in the radio personal stations. In FIG. 2, reference numeral 21 designates the radio cell station shown in FIG. 1, and 28 designates the radio personal station shown in FIG. 1. An example of the connection between the radio cell stations and the radio personal stations is shown in FIG. 3. In FIG. 3, reference numerals 21a–21c designate the radio cell stations each of which has the same construction as the radio cell station 21 shown in FIG. 1. Reference numerals 28a–28d designate the radio personal stations each of which has the same construction as the radio personal station 28 shown in FIG. 1.

In this case, as the embodiment of the present invention, the description will now be given with respect to a local voice communication system. In the local voice communication system, a plurality of store clerks in a large scale shopping center have the respective radio personal stations 28. The store clerks carry out the in-store business while they communicate with each other through the voice calls or while they communicate with a supervisor who should direct all of them.

The radio cell stations 21 are installed in a plurality of locations in the shopping center, and are connected to the main equipment 26 through the wires. The main equipment 26 is also connected to the multi-media server 27. The in-store information which is presented in the form of a voice or data by the multi-media server 27 is sent to the radio personal stations 28, which the store clerks have, through both of the main equipment 26 and the radio cell stations 21.

First of all, it is assumed to be in the monitoring state in which the in-store information is simultaneously transmitted from the multi-media server 27 to the store clerks. The operation will be described with reference to the sequence chart of FIG. 2. In accordance with the instruction issued from the main equipment 26, the radio cell stations 21 simultaneously inform onto the radio channel the voice or data presented by the multi-media server 27. The information exhibiting the carrier frequency and the slot both of which are used in the simultaneous information is stored in the radio channel managing unit 22 (Sequence 32). In accordance with the associated electric wave situation, each of the radio cell stations 21 determines the carrier frequency and the slot so as not to overlap with those of the other radio cell stations. Then, each of the radio cell stations 21 carries out the simultaneous information using the determined carrier frequency and the determined slot. The information of the carrier frequency and slot for use in the simultaneous information is stored in the radio channel managing unit 22 in order to be managed.

Now, as a method of informing a voice or data, there is a method in which a pseudo radio personal station is defined. That is, in the method, a call path using a call channel between a certain radio cell station and the pseudo radio personal station is formed to proceed temporarily to the call state. The voice or data of the simultaneous information is sent through the call path. In this state, the other radio personal stations monitor the voice or data on the call path. In addition thereto, there is also conceivable a method in which the radio cell stations independently inform a voice or data while confirming that the electric wave interference is not applied to any other radio apparatuses.

After having started the simultaneous information of the voice or data, each of the radio cell stations 21 retrieves the information (the frequency and slot information) of the simultaneous information, which is managed in the radio channel managing unit 22, using the function of the information channel managing unit 25. Then, each of the radio cell stations 21 transmits the retrieved information on the control channel (CCH) using the function of the control channel controlling unit 23 (Sequence 33).

Each of the radio personal stations 28 carries out the open search in order to find out the control channel (CCH) through which the radio cell station transmits the information. If the control channel (CCH) of any one of the radio cell stations 21 (the associated cell station) is found out, each of the radio personal stations 28 receives the information for the simultaneous information contained on the found-out control channel (CCH) (Sequence 34). After the reception of the information (the slot and frequency information) of the simultaneous information, each of the radio personal stations 28 starts only the reception operation with the received frequency and the received slot to proceed to the information monitoring state (Sequence 35).

In the information monitoring state, it is assumed that a user of one of the radio personal stations 28 carries out the manipulation for a call. The radio personal station 28 of interest, which the user uses, transmits through the control channel (CCH) the assignment request for getting the associated radio cell station 21 to assign thereto a traffic channel (TCH). That is, the radio personal station 28 of interest transmits through the control channel controlling unit 29 the assignment request for getting the associated radio cell station 21 to assign thereto a traffic channel (Sequence 36), and then executes the line connection procedure under the control of the line connection controlling unit 30. In this connection, when the radio personal station 28 of interest is called from any one of the other radio personal stations, the main equipment 26 sends the information of the reception thereof to the radio personal station 28 of interest. Then, the radio personal station 28 of interest sends the assignment request for getting the associated radio cell station to assign thereto the traffic channel. Thereby, the line connection procedure is carried out.

Now, there is also the case where the assignment of the traffic channel (TCH) is carried out in the following manner in order to speedily carry out the transition from the information monitoring state to the one-to-one correspondence call state. The assignment request for proceeding to the call state is transmitted to the associated radio cell station not through the control channel (CCH) but using the information channel (the slot and frequency for use in monitoring) through which the monitoring is currently carried out. If this procedure is adopted, then the transition from the information monitoring state to the one-to-one correspondence call state can be carried out in instant (within 300 msec).

In each of the radio cell stations 21 as well, the line connection procedure is carried out under the control of the line connection controlling unit 24. The call channel is set between the radio personal station 28 of interest and the radio cell station 21 of interest. As a result, the radio cell station 21 of interest proceeds to the one-to-one correspondence call state (Sequence 37).

In this sequence of the line connection procedure, the line connection controlling unit 24 in each of the radio cell stations 21 retrieves the channel information (the slot and frequency information for monitoring) of the simultaneous information, which is provided by the information channel managing unit 25, from the radio channel managing unit 22. Then, the line connection controlling unit 24 transmits the retrieved channel information to the radio personal stations 28a-28d through the traffic channel (TCH).

When intending to transmit the slot and frequency information for the simultaneous information, the line connection controlling unit 24 on the radio cell station side converts the slot and frequency information into the relative slot information from the slot through which the radio personal station 28 of interest makes the call to transmit the resultant information. In this case, the channel information for the simultaneous information transmitted from the radio cell station 21 of interest to the radio personal station 28 of interest may be transmitted with the channel information carried on the "Notify" message or the like defined by the ISDN (Integrated Services Digital Network) in some cases. In addition, the channel information of the simultaneous information may be transmitted by defining the special information elements in the "call proceeding", the "Connect" message or the like in other cases.

As described above, in the one-to-one correspondence call state as well, the channel information (the slot and frequency information for monitoring) of the occasional simultaneous information is sent from the radio cell station 21 of interest to the radio personal station 28 of interest in the call state through the traffic channel (TCH). For example, the channel information of the simultaneous information is transmitted to the radio personal station 28 of interest when proceeding to the call state. Then, the channel information is transmitted to the radio personal station 28 of interest again in the case where the slot and frequency information for the simultaneous information is changed. At the time when having received the channel information of the simultaneous information, the radio personal station 28 of interest stores the data of interest in the information channel storage unit 31 thereof (Sequence 38). In this connection, after having proceeded to the one-to-one correspondence call state, the line connection controlling unit 30 on the radio personal station side may inquire personally of the radio cell station 21 of interest the newest slot and frequency information for the simultaneous information in some cases.

Thereafter, at the time when the user of the radio personal station 28 of interest carries out the manipulation for quitting the one-to-one correspondence call, the disconnection restoration sequence is executed (Sequence 39). Then, the radio personal station 28 of interest makes the transition to the state of monitoring the informed information again. When making the transition to the monitoring state, the radio personal station 28 of interest sets the slot and the carrier frequency, which are to be used, on the basis of the channel information (the slot and frequency information for monitoring) of the simultaneous information stored in the information channel storage unit 31 to be switched over to the monitoring state (Sequence 40). That is, the radio personal station 28 of interest can immediately proceed to the information monitoring state under the pseudo channel switching control without receiving any of data on the control channel (CCH).

The example in the case where the position of the radio personal station 28 of interest is not changed at all has been described. However, there is also the case where while carrying out the one-to-one correspondence call, the user of interest moves, so that the radio personal station 28 which the user of interest has enters into the area of other radio cell station. Next, the operation in such a case will hereinbelow be described.

In FIG. 3, it is assumed that the radio personal station 28a which is located in the area of the radio cell station 21a proceeds from the information monitoring state to the one-to-one correspondence call state, and while maintaining the one-to-one correspondence call state, is moved to go out from the area of the radio cell station 21c to be handed over to other radio cell station. The line connection controlling unit 24 in the radio cell station 21c transmits, in a similar manner as described above, the channel information of the simultaneous information which the radio cell station 21c has to the radio personal station. Therefore, the line connection controlling unit 24 in the radio parent phone 21c sends the channel information of the simultaneous information to the radio personal station 28a as well which has newly entered into the area thereof. As a result, if the radio personal station 28a enters into the area of the radio cell station 21c, then the radio personal station 28a will store the channel information of the simultaneous information of the radio cell station 21c.

Thereafter, at the time when the user of the radio personal station 28a carries out the manipulation for quitting the one-to-one correspondence call state, the disconnection restoration sequence is executed, and then the radio personal station 28a makes the transition to the monitoring state. In this connection, the radio personal station 28a sets the slot and the carrier frequency on the basis of the channel information of the simultaneous information of the radio cell station 21c which information is already received when being handed over thereto. As a result, the radio personal station 28a can immediately proceed to the information monitoring state in the area of the radio cell station 21c.

The above-mentioned example is the example in which the radio personal stations 28 of interest makes the one-to-one correspondence call in the information monitoring state. Alternatively, there is the case where one user among the users who have the radio personal stations 28 switches the information monitoring state over to the simultaneous broadcasting state in which he/she notifies simultaneously all of other radio personal stations of something. Next, the operation in such a case will be described below.

In FIG. 3, at the time when a user who has a certain radio personal station 28a carries out the manipulation for switching the information monitoring state over to the simultaneous broadcasting state, the certain radio personal stations 28a proceeds to the simultaneous broadcasting state. In the simultaneous broadcasting state, the voice transmitted from the radio personal station 28a of interest is divided in the main equipment 26 to be simultaneously transmitted to all of other radio personal stations. Users who have other radio personal stations can listen to the voice transmitted from the radio personal station 28a while maintaining the information monitoring state as it is.

The radio cell station 21a transmits, in a similar manner as described above, suitably the channel information of the simultaneous information which the radio cell station 21a has to the associated radio personal stations. Therefore, the radio cell station 21a sends the channel information of the simultaneous information to the radio personal station 28a as well in which the information monitoring state has been switched over to the simultaneous broadcasting state. Then, the radio personal station 28a stores the channel information of the simultaneous information of the radio cell station 21a.

Thereafter, at the time when the radio personal station 28a is returned back to the information monitoring state, the radio personal station 28a can set the slot and the carrier frequency on the basis of the newest simultaneous-information-channel information to proceed immediately to the information monitoring state.

In this connection, in the case where the line connection controlling unit 30 on the radio personal station side fails to obtain the channel information of the simultaneous information when switching the operation over to the one-to-one correspondence call, the data is collected by switching over to the control channel (CCH). Then the monitoring reception are restarted in accordance with the channel information for the simultaneous information obtained from the control channel.

As set forth hereinabove, in the radio communication system according to the present invention, when the radio personal station of interest proceeds to the call state, the line connection controlling unit on the radio cell station side transmits the channel information of the simultaneous information to the radio personal station of interest. The information channel storage unit on the radio personal station side stores the channel information. When the call is quitted, the radio personal station of interest refers to the channel information in the information channel storage unit to restart immediately the monitoring and reception. Thereby, there is obtained the advantageous effect that when the radio personal station of interest proceeds from the information monitoring state to the call state, and then is returned back to the information monitoring state again, the simultaneously informed information can be thoroughly transmitted.

In addition, when the slot and frequency information is transmitted as the channel information of the simultaneous information, the line connection controlling unit on the radio cell station side converts the slot and frequency information into the relative slot information from the slot through which the radio personal station makes a call to transmit the resultant information. Thereby, there is obtained the advantageous effect that the processing of the radio personal station can be simplified and also a time period required for the radio personal station of interest to restart the monitoring and reception can be shortened.

Also, only when the radio personal station proceeds to the monitoring and reception state after quitting the call, the line connection controlling unit on the radio cell station side transmits the channel information of the simultaneous information at that time. Thereby, there is obtained the advantageous effect that the unnecessary message can be prevented from being transmitted to any of the normal radio personal stations which do not carry out the monitoring and reception.

Further, when the slot and the frequency of the simultaneous information are changed after having once transmitted the channel information of the simultaneous information, the line connection controlling unit on the radio cell station side transmits that information to the radio personal station again. Thereby, there is obtained the advantageous effect that even if the monitoring channel of the simultaneous information is changed due to the electric wave situation, the radio personal station can accurately make the transition to the information monitoring state.

Further, after having proceeded to the call state, the line connection controlling unit on the radio personal station side personally inquires of the associated radio cell station the channel information of the simultaneous information at that time. Thereby, there is obtained the advantageous effect that it can cope as the independent control unit therewith without influencing upon the existing line connection control.

Furthermore, the correction of the relative position of the monitoring slot and the frequency correction which are generated due to the channel switching and the like of the radio personal station are carried out in the radio personal station. Thereby, there is obtained the advantageous effect that the influence due to the channel switching and the like can be prevented within the radio personal station and hence the influence upon other control can be minimized.

Furthermore, when the line connection controlling unit on the radio personal station fails to obtain the channel information for the simultaneous information on the call channel, it collects the data on the control channel, obtains the channel information for the simultaneous channel which is sent through the control channel, and restarts the monitoring and reception in accordance with the slot and frequency information contained in the channel information. Thereby, there is obtained the advantageous effect that the normal operation of the line connection controlling unit can be carried out and hence the failsafe can be realized.

While the present invention has been particularly shown and described with reference to the preferred embodiments, it will be understood that the various changes and modifications will occur to those skilled in the art without departing from the scope and true spirit of the invention. The scope of the invention is therefore to be determined solely by the appended claims.

What is claimed is:

1. A radio communication system including a radio personal station and a plurality of radio cell stations, said radio personal station being able to monitor and receive a voice and data which are informed at all times, wherein each of said plurality of radio cell stations comprises:
a radio channel managing unit for managing channel information of a frequency and a slot which are to be used;
a radio cell station line connection controlling unit for managing a line connection between said radio personal station and the radio cell station; and
an information channel controlling unit for storing channel information used to simultaneously inform information, said radio personal station comprises:
a radio personal station line connection controlling unit for managing a line connection control between the radio cell station and the radio personal station; and
an information channel storage unit for storing the channel information for the simultaneous information which is received from the radio cell station, said radio cell station line connection controlling unit retrieves, when the radio personal station proceeds to a call state, the channel information stored in said information channel controlling unit to send the retrieved channel information to the radio personal station, and said radio personal station line connection controlling unit sets, when the call state is quitted, a slot and a frequency on the basis of the channel information stored in said information channel storage unit to restart monitoring and reception.

2. A radio communication system according to claim 1, wherein when slot and frequency information is transmitted as current channel information of the simultaneous information, said radio cell station line connection controlling unit converts the slot and frequency information into relative slot information from a slot through which said radio personal station makes a call.

3. A radio communication system according to claim 1, wherein only when said radio personal station proceeds to a monitoring and reception state after quitting the call, said radio cell station line connection controlling unit transmits slot and frequency information for the simultaneous information at that time to said radio personal station.

4. A radio communication system according to claim 1, wherein when slot and frequency information for the simultaneous information is changed after having transmitted the slot and frequency information for the simultaneous information to said radio personal station, said radio cell station line connection controlling unit transmits the slot and frequency information to said radio personal station again.

5. A radio communication system according to claim 1, wherein after said radio personal station proceeds to the call state, said radio personal station line connection controlling unit inquires personally of the radio cell station newest slot and frequency information for the simultaneous information.

6. A radio communication system according to claim 1, wherein relative position correction of the monitoring slot and frequency correction which are generated due to channel switching of said radio personal station are carried out in said radio personal station.

7. A radio communication system according to claim 1, wherein when said radio personal station line connection controlling unit fails to obtain the channel information for the simultaneous information on a call channel, said radio personal station line connection controlling unit collects data on a control channel, obtains the channel information for the simultaneous information which is sent through the control channel, and restarts the monitoring and reception in accordance with slot and frequency information contained in the channel information.

8. A monitoring proceeding method for use in a radio communication system including a radio personal station and a radio cell station, said radio personal station being able to monitor and receive a voice and data which are informed at all times except for during a call through said radio cell station, wherein in said radio cell station, a radio channel managing unit manages a frequency and a slot which are to be used, and an information channel controlling unit stores channel information which is used to simultaneously inform information;

in said radio personal station, an information channel storage unit stores the simultaneous-information-channel information which is received from said radio cell station;

when said radio personal station proceeds to a call state, a radio cell station connection controlling unit of said radio cell station transmits the simultaneous-information-channel information which is presented by said information channel controlling unit to said radio personal station; and when the call is quitted, a radio child line connection controlling unit of said radio personal station sets information of a slot and a frequency on the basis of the simultaneous-information-channel information stored in said information channel storage unit to restart monitoring and reception.

* * * * *